AIRCRAFT

Filed Dec. 16, 1968 5 Sheets-Sheet 1

INVENTORS
Kenneth Arthur Pearson &
Geoffrey Harry Wright
BY
Mawhinney & Mawhinney
ATTORNEYS

AIRCRAFT

INVENTORS
Kenneth Arthur Pearson &
Geoffrey Harry Wright
BY
Mawhinney & Mawhinney
ATTORNEYS

*INVENTORS*
Kenneth Arthur Pearson &
Geoffrey Harry Wright
BY Mawhinney & Mawhinney
*ATTORNEYS*

AIRCRAFT

*INVENTORS*
Kenneth Arthur Pearson &
Geoffrey Harry Wright

BY Mawhinney & Mawhinney
*ATTORNEYS*

AIRCRAFT

Filed Dec. 16, 1968 5 Sheets-Sheet 5

INVENTORS
Kenneth Arthur Pearson &
Geoffrey Harry Wright
BY Mawhinney & Mawhinney
ATTORNEYS United States Patent Office 3,489,377
Patented Jan. 13, 1970

1

3,489,377
AIRCRAFT

Kenneth Arthur Pearson and Geoffrey Harry Wright, Filton, Bristol, England, assignors to Rolls-Royce Limited, a British company Filed Dec. 16, 1968, Ser. No. 783,989
Claims priority, application Great Britain, Dec. 21, 1967, 58,059/67
Int. Cl. B64d *41/00, 33/06*
U.S. Cl. 244—58 9 Claims

ABSTRACT OF THE DISCLOSURE

An aircraft having at least one main forward propulsion engine is provided also with an auxiliary engine which is capable of operating in two modes, either as a thrust producer in a first mode, or to produce a shaft power for driving aircraft services in a second mode. The intake and exhaust ducts of the auxiliary engine are provided with silencing means for use in the second mode.

This invention relates to an aircraft and relates more particularly to means for providing a combined thrust boost and auxiliary power unit for an aircraft.

According to the present invention there is provided an aircraft having at least one main forward propulsion engine, an auxiliary gas turbine engine which is capable of two modes of operation, a first mode being one in which the engine produces a forward thrust on the aircraft, and a second mode being one in which the engine provides aircraft interior supplies independently of the main engine, a propulsion nozzle through which the exhaust gases produced by the auxiliary engine in the first mode of operation pass to provide said forward thrust on the aircraft, means for providing the aircraft interior supplies including a shaft for driving aircraft services at least in the second mode, an air intake, means selectively operable for silencing the air intake when the engine is operating in the second mode, and means selectively operable for silencing the exhaust gases produced by the engine when the engine is operating in the second mode.

The term aircraft services is meant to include electrical generators, compressors and like apparatus for providing the aircraft interior supplies which include, for example, heat, light and air conditioning, which must be provided when the main engine is not running, for example, when the aircraft is on the ground, or in emergencies, such as main engine failure in flight.

The auxiliary gas turbine engine may be operated in the two modes either independently or simultaneously.

The aircraft may be provided, in addition to the propulsion nozzle, with an auxiliary exhaust gas outlet for use in the second mode of operation, means being provided for selectively directing the exhaust gases of the engine either to the propulsion nozzle or the alternative outlet, the alternative outlet being provided with silencing means for reducing the noise level in the exhaust gas stream.

The auxiliary engine is preferably provided with a flap for blocking the flow of exhaust gases through the propulsion nozzle and for deflecting the exhaust gases through the alternative exhaust gas outlet when the engine is operating in the second mode. Thus the alternative exhaust gas outlet may be located on the top of the aircraft fuselage and the flap may thus direct the exhaust gases upwardly through the alternative exhaust gas outlet, so that the perceived noise level to an observer on the ground behind the aircraft is attenuated.

In a preferred embodiment the alternative exhaust gas outlet is provided with sound absorbing means by which

2 the noise level in the exhaust gas stream itself may be reduced. Thus the said outlet may be provided with elongate splitters made in sound absorbing material which are arranged to split the exhaust gas stream into a plurality of streams.

It is to be understood that silencing means includes means for both reducing the noise level in the exhaust gas stream and for directionally attenuating the perceived noise level to an observer on the ground.

The auxiliary engine may be mounted within the aircraft fuselage and may have an air intake duct which communicates, at one of its ends, with the inlet to the compressor casing and at the other of its ends with atmosphere through an air inlet in the fuselage.

The air intake duct is preferably provided with noise reducing means which may be in the form of sound absorbing splitters moveably mounted within the intake duct wall at the inlet end of the duct, so as to be capable of movement between a retracted position, in which the duct is free from protruberances, and an operative position in which the air in the duct is caused to flow therebetween thereby reducing noise emanating from the duct. The splitters may be further pivotally mounted so that whilst still in a retracted position they may be moved to a position in which the air inlet in the fuselage is blocked and they form a smooth continuation of the fuselage surface.

The movement of the splitters into and out of their operative positions may be performed by rams and a "lazy tongs" arrangement of levers. The pivotal movement of the splitters may also be caused by rams.

The invention also includes an auxiliary gas turbine engine for operation in an aircraft as described above.

The invention will now be described in more detail, merely by way of example, with reference to the accompanying drawings in which.

FIG. *5a* and *5b* illustrate another alternative intake arrangement.

When an aircraft is in flight auxiliary services such as air conditioning and electricity for lighting are provided by the man engines. For example, air conditioning is obtained by an air bleed from the main engine low pressure compressor, and electricity from generators driven by the main engines.

When the aircraft is on the ground, however, it is not convenient to run the main engines since they are noisy and uneconomical and it has been the practice for the aircraft to carry an auxiliary power unit to provide the said supplies. The auxiliary power unit can also take over from the main engines in flight to provide aircraft supplies in the event of an engine failure.

Figure 1:
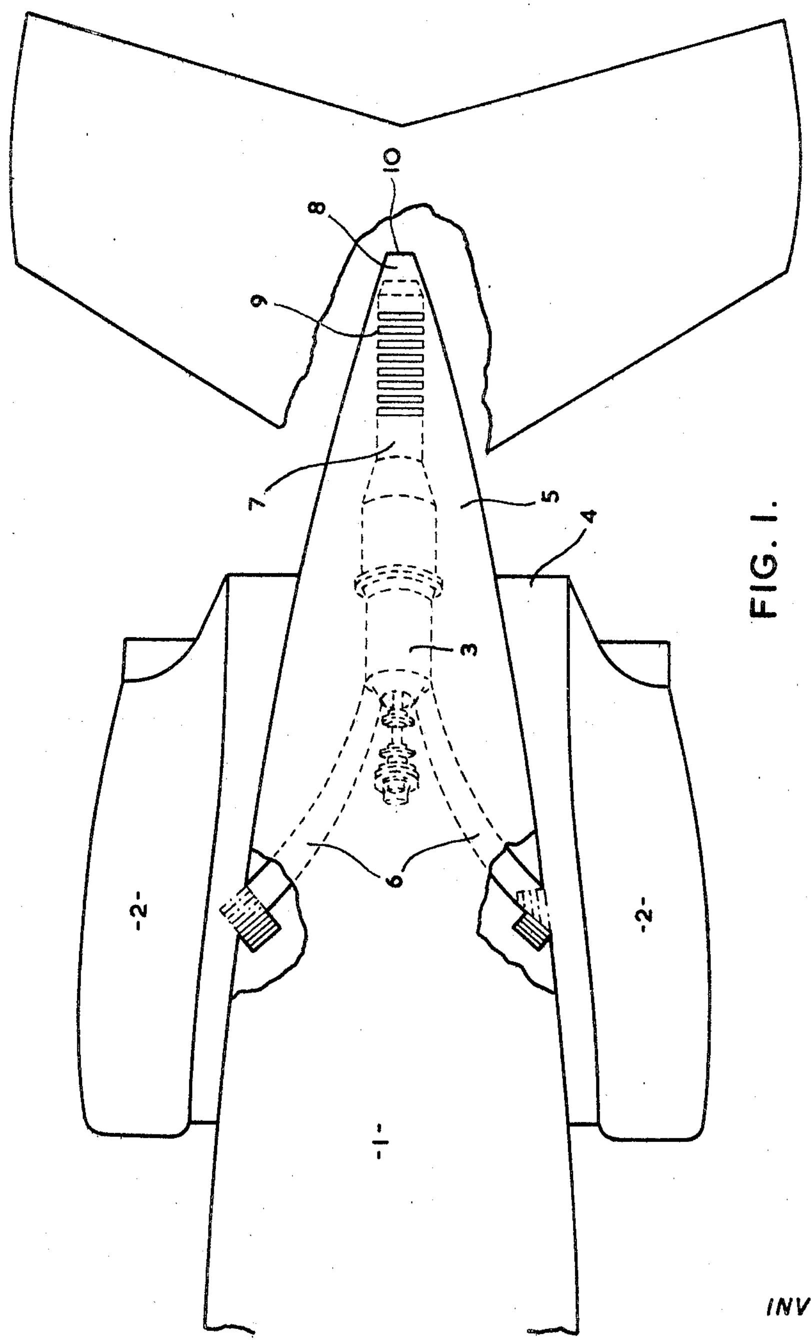
FIG. 1 is a plan view of the rear portion of an aircraft with an auxiliary engine according to the present invention.

Referring now to the drawings, in FIG. 1 there is shown an aircraft 1 having two main forward propulsion engines 2 and an auxiliary gas turbine engine 3. The two main propulsion engines are mounted on spars 4 from opposite sides of the fuselage 5 at the rear of the aircraft and the auxiliary gas turbine engine 3 is mounted within the fuselage 5 and is provided with two airintake ducts 6 and an exhaust duct 7.

The exhaust duct 7 communicates with two exhaust gas outlets 8 and 9. The outlet 8 is directed rearwardly of the aircraft is provided with a propulsion nozzle 10 whereby a forward thrust may be provided on the aircraft in addition to that provided by the main engines 2. The outlet 9 is an alternative outlet for use only when the propulsion nozzle 10 is not in operation, for example, when the aircraft is stationary on the ground, and is disposed in the top of the aircraft fuselage.

Figure 2:
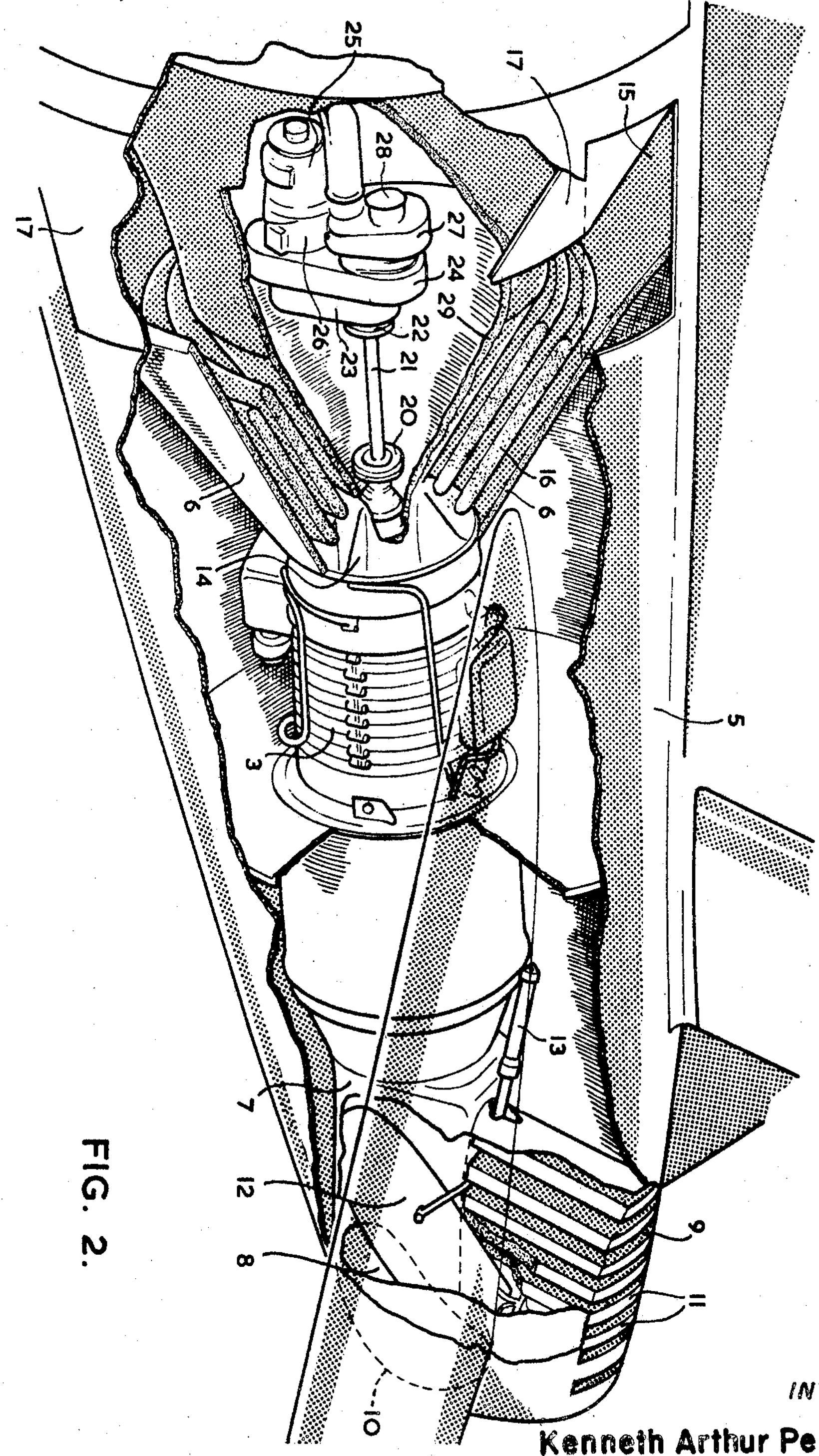
FIG. 2 is a pictorial view of the auxiliary engine of FIG. 1 showing an alternative intake system.

Turning now to FIG. 2 wherein the engine 3 is shown in more detail, the alternative exhaust gas outlet 9 is provided with a plurality of splitters 11 made of a sound absorbing material. The main function of the splitters is to reduce the noise level in the exhaust gas, but they also serve to aid in the deflection of the exhaust gases through the outlet so that the exhaust gases pass to atmosphere with an upwardly directed component of velocity in order to further attenuate the noise level perceived by an observer standing on the ground behind the aircraft. The splitters are made from a glass fibre material covered by a thin metal skin which has a multiplicity of small holes therethrough.

A deflector flap 12 is mounted inside the exhaust duct 7 downstream of the alternative outlet 9. The flap 12 is mounted from the top surface of the duct 7 and is pivotable from a first position in which it blocks the alternative outlet 9 and allows the flow of exhaust gases through the propulsion nozzle 10, to a second position in which it blocks the outlet 8 and allows the flow of exhaust gases through the alternative outlet 9. The deflector flap 12 is moved by a pneumatic ram 13. Alternatively, the ram may be operated by any other convenient means, for example, it may be hydraulic or electrically operated.

At the intake end of the engine, the air intake ducts 6 each communicate at one end with the compressor inlet 14 of the engine and communicate at their other respective ends with air inlets 15 disposed in the aircraft fuselage 5. Disposed in the intake ducts 6 are splitters 16 which are made from sound absorbing material comprising a glass fibre material covered by a perforated metal skin. In this example the air inlet is provided with a door 17, shown open at the top inlet and closed at the bottom inlet, and the splitters are not movable.

The main shaft of the engine, which drivingly connects the engine turbine and compressor, is extended forwardly of the engine by means of a coupling 20 and a shaft 21 to provide a drive for the engine services. The shaft 21 is coupled by a further coupling 22 to a clutch 23 and gearbox 24, which together form a transmission system. Two drives are taken from the gearbox, one for a generator 25 driven through a constant speed drive unit 26, and the second to an auxiliary air compressor 27 which provides air for air conditioning through a duct 28 to the aircraft interior. The clutch 23 provides for engaging and disengaging the drive to the auxiliary compressor when the engine is operated in the thrust boost mode but electrical services are still maintained while the auxiliary engine is running.

It will be appreciated that the number and positions of the components of the transmission system and the auxiliary drives may be varied and the invention is not meant to be limited to the arrangement shown herein. For example, all the aircraft services driven by the auxiliary engine may be de-clutched when the engine is operating as a thrust boost unit. In an alternative system an air bleed arrangement may be provided on the engine so that the air conditioning may be supplied to the aircraft without the need to drive an auxiliary air compressor.

Figure 3:
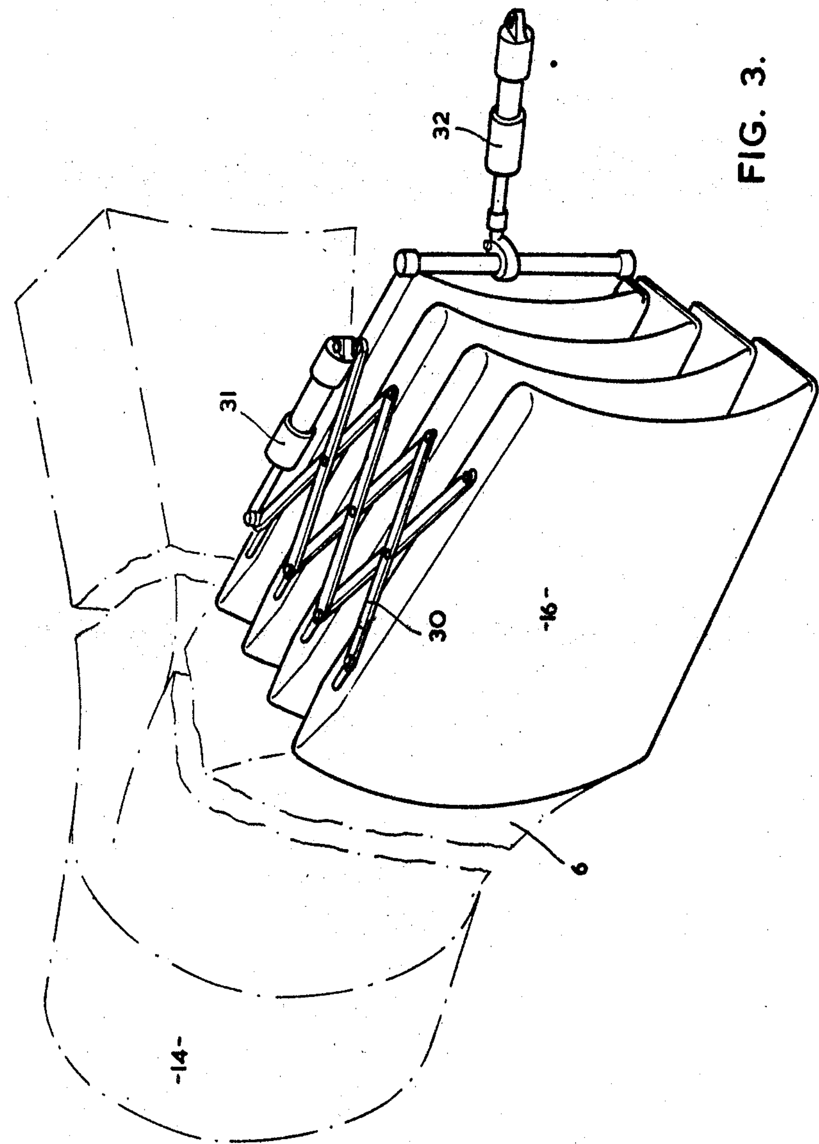
FIG. 3 is a diagrammatic view of the intake of FIG. 1 showing the construction of intake splitters and their means of actuation.

In the embodiment shown in FIG. 1, the splitters 16 in the intake are retractable so that they may be moved into a suitable aperture in the radially inner wall of the intake duct 6. FIG. 3 shows one method by which this movement moy be performed. The separate splitter members are interconnected by a "lazy tongs" arrangement of levers 30 and are moved by the action of a hydraulic ram 31. This arrangement applies to the movement of both sets of intake splitters. A second hydraulic ram 32 is also provided to pivot the whole set of splitters 16 while in their retracted position to a position in which they block the air inlet 15 when the auxiliary gas turbine engine is not being used.

Figure 4:
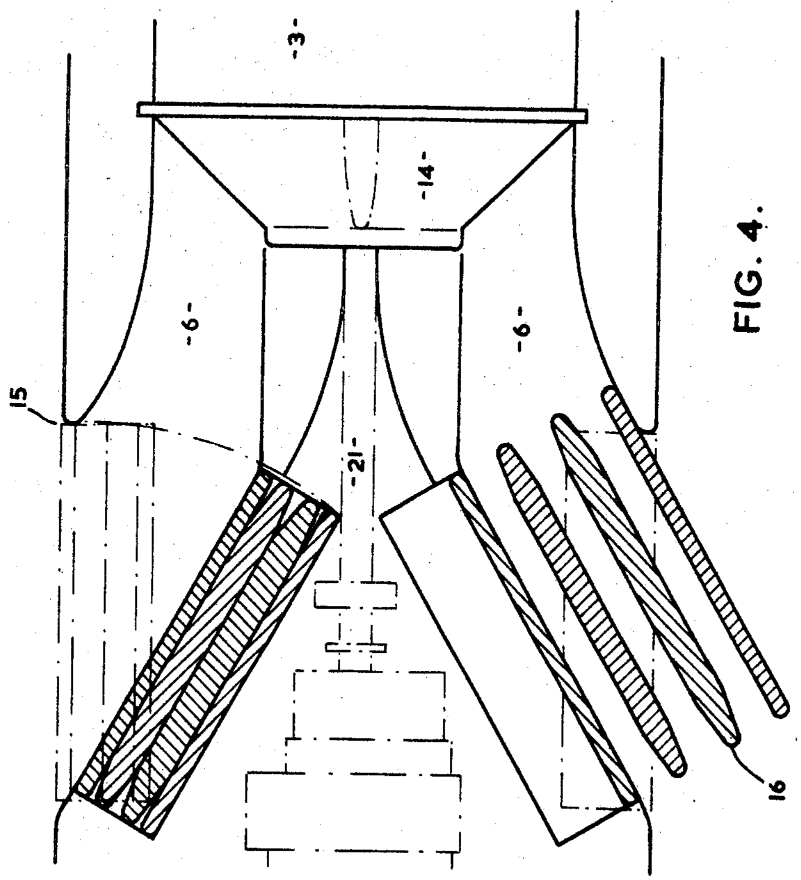
FIG. 4 illustrates diagrammatically the three positions taken up by the intake splitters of FIG. 3.
Figure 5A:
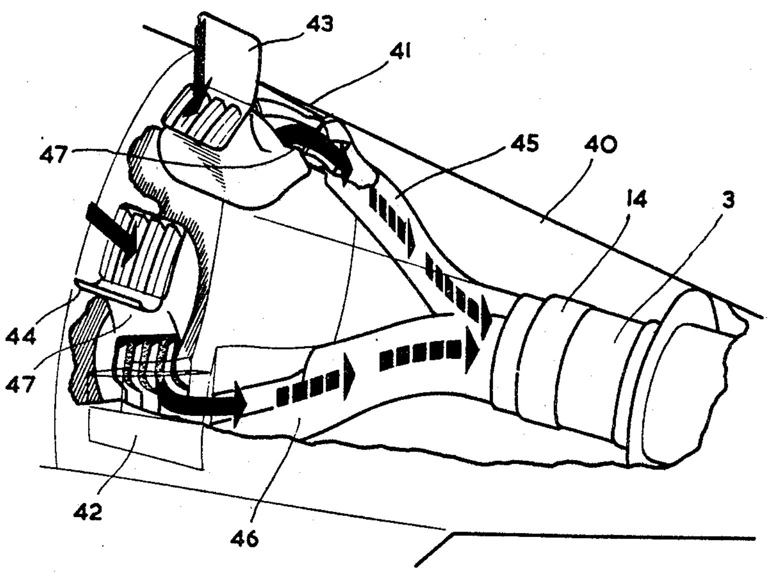
Figure 5B:
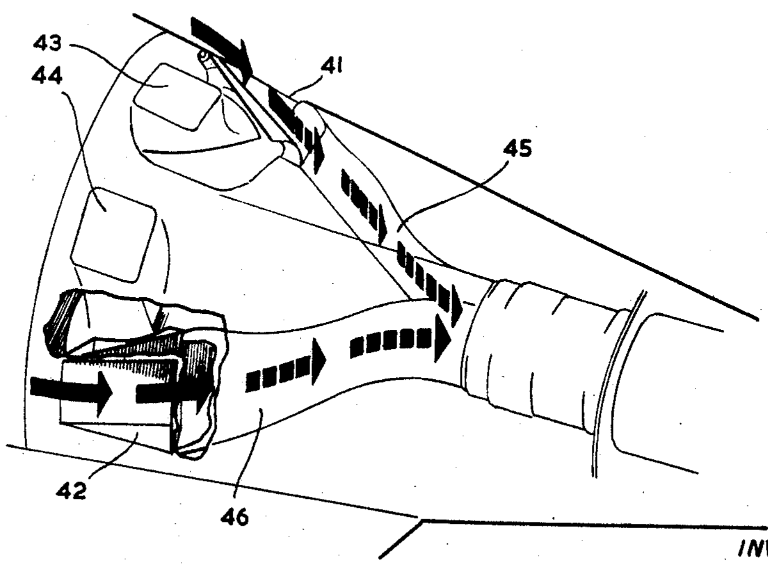

The arrangement of the splitters in their three position is shown diagrammatically in FIG. 4.

FIG. 4 shows three positions of the splitters 16 in an aircraft installation. In the top half of the figure the splitters are shown in two positions in full and dotted lines respectively. The full lines show the position of the splitters in the first mode of operation of the auxiliary engine in which the splitters are retracted into the side wall of the inlet duct 6 thereby leaving a clear flow passage for the air into the compressor inlet. The dotted lines show the position of the splitters for blocking the intake when the auxiliary engine is not in use.

In the bottom half of the drawing the splitters are shown in a position in which they are extended into the inlet duct 6 and separated so that a silencing effect is produced on the air flowing over the splitters. This is the position they will take up when the engine is run in the second mode.

The lever system for operating the splitters has been omitted since it is shown in greater detail in FIG. 3.

The operation of the auxiliary engine is as follows:

When the auxiliary engine is required to provide thrust boost alone to assist the main engines in take-off or climb, the propulsion nozzle 10 is opened by pivoting the deflector flap 12 to its first position and the alternative outlet is blocked.

The intake splitters are retracted to the position shown in FIG. 4 and the shaft 21 is disconnected from the aircraft services by the clutch 23. The engine is then run at full throttle to provide thrust with an unimpeded and unsilenced gas flow.

When auxiliary aircraft services are required, while the aircraft is on the ground, the engine is run at say, 40% to 50% of full throttle, for economy. The deflector flap 12 is pivoted to open the alternative outlet 9 and close the outlet 8, the intake splitters 6 are extended to the position shown in FIG. 4 and the shaft 21 is connected by the clutch 23 to drive the aircraft services. In this mode of operation, the engine is running comparatively quiet due to the silencing of the intake and exhaust gas streams.

FIGS. *5a* and *5b* show yet another alternative intake arrangement in which an aircraft fuselage 40 is provided with four inlet doors 41, 42, 43 and 44. The doors 41 and 42 communicate directly with a pair of inlet passages 45 and 46 which conduct air from atmosphere to the compressor inlet 14 of the auxiliary engine 3. The path along which the air has to flow is in this case unobstructed and the doors 41 and 42 are opened when the engine is run in the first mode of operation, i.e. to produce thrust. In this mode of operation the doors 43 and 44 remain closed, see FIG. *5b*. The doors 41 and 42 open inwardly to produce minimum drag on the aircraft when open in flight.

The doors 43 and 44 communicate with the inlet passages 45 and 46 via a second pair of passages 47 which contain silencing splitters 47 and which are themselves lined with sound absorbing material. These doors 43 and 44 are used only in the second mode of operation, and the doors 41 and 42 remain closed, see FIG. *5a*.

In the operation of some aircraft it may be necessary to have some aircraft services maintained independently of the main engines during take-off when the auxiliary engine is operating in the thrust-boost mode. This may be achieved by arranging the transmission system to disconnect only those services which are not required and to maintain a drive to the services required.

In such a case the propulsion nozzle of the auxiliary engine will be in use and the intake need not be silenced.

If aircraft services are required on failure of one of the main engines the auxiliary engine is used but again the silencing features need not necessarily be used.

Finally the inlets 15 are blocked off by moving the splitters to the position shown in FIG. 4*c* when the auxiliary engine is not required. Thus the drag on the aircraft due to the inlets is eliminated.

The gas turbine engine may be a ducted fan engine.

What we claim is:

1. An aircraft having at least one main forward propulsion engine, an auxiliary gas turbine engine which is capable of two modes of operation, a first mode being one in which the engine produces a forward thrust on the aircraft, and a second mode being one in which the engine provides aircraft interior supplies independently of the main engine, a propulsion nozzle through which the exhaust gases produced by the auxiliary engine in the first mode of operation pass to provide said forward thrust on the aircraft, means for providing the aircraft interior supplies including a shaft for driving aircraft services at least in the second mode, an air intake, means selectively operable for silencing the air intake when the engine is operating in the second mode, and means selectively operable for silencing the exhaust gases produced by the engine when the engine is operating in the second mode.

2. An aircraft as claimed in claim 1 and in which the means for silencing the exhaust gases comprises an auxiliary exhaust gas outlet and means selectively operable to deflect the engine exhaust gases through the auxiliary exhaust gas outlet when the engine is operating in the second mode.

3. An aircraft as claimed in claim 2 and in which the alternative exhaust gas outlet directs the exhaust gases upwardly to attenuate the noise level perceived by an observer on the ground.

4. An aircraft as claimed in claim 2 and in which the alternative exhaust gas outlet is lined with sound absorbing material.

5. An aircraft as claimed in claim 2 and in which the alternative exhaust gas outlet is provided with splitters made of a sound absorbing material.

6. An aircraft as claimed in claim 1 and in which means are provided for connecting and disconnecting the shaft from one or more of the aircraft services.

7. An aircraft as claimed in claim 1 and in which the means for silencing the air intake comprises a plurality of splitters which are movable between an operative position in which the air entering the intake passes therebetween, and a non-operative position in which the intake is unobstructed thereby.

8. An aircraft as claimed in claim 7 and in which the air intake is disposed in the aircraft fuselage and the splitters, whilst in the non-operative position, are further movable into a position in which the air intake is blocked and the splitters form a continuation of the surface of the aircraft fuselage to substantially eliminate the drag of the air intake.

9. An aircraft according to claim 7 and in which the splitters are movable between said operative and non-operative positions by a lazy-tongs arrangement of levers.

References Cited

UNITED STATES PATENTS

| | | | |
|---|---|---|---|
| 2,477,637 | 8/1949 | Mercer | 244—53 |
| 2,944,623 | 7/1960 | Bodine | 181—33 |
| 3,177,972 | 4/1965 | Wirt | 181—33 |

FOREIGN PATENTS 924,078 4/1963 Great Britain.

MILTON BUCHLER, Primary Examiner

J. S. PITTENGER, Assistant Examiner

U.S. Cl. X.R.

137—15.1; 181—56; 230—133